June 3, 1941.   W. E. WHITNEY   2,243,934
CONTROL ASSEMBLY
Filed March 24, 1938   3 Sheets-Sheet 1

Inventor,
William E. Whitney,
by Roberts, Cushman & Woodberry,
Attys.

June 3, 1941.  W. E. WHITNEY  2,243,934
CONTROL ASSEMBLY
Filed March 24, 1938  3 Sheets-Sheet 2
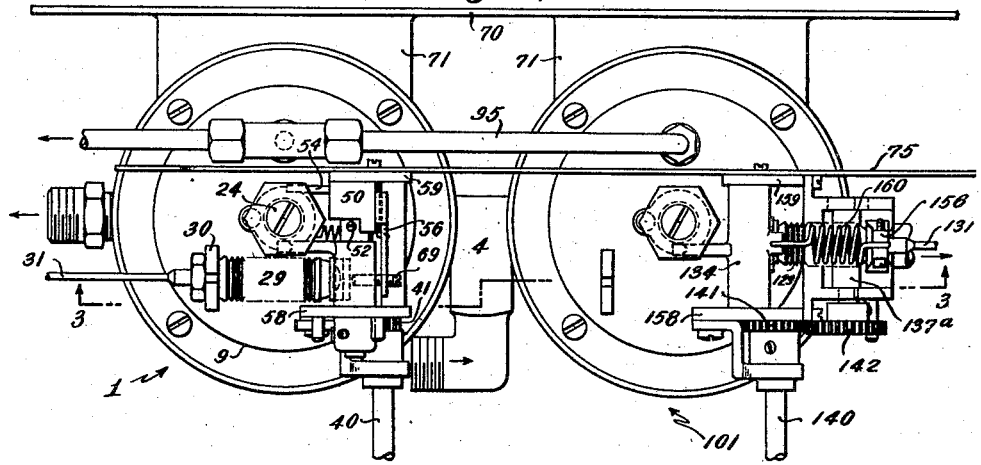
Fig. 2.
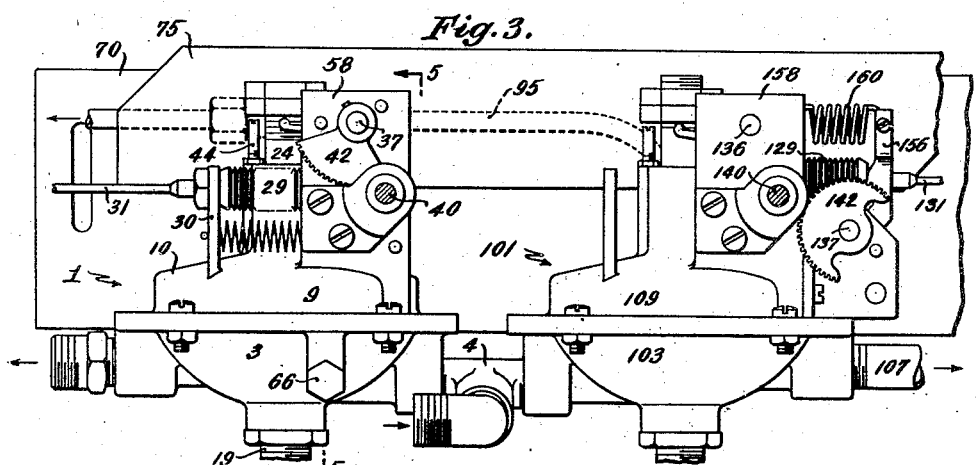
Fig. 3.
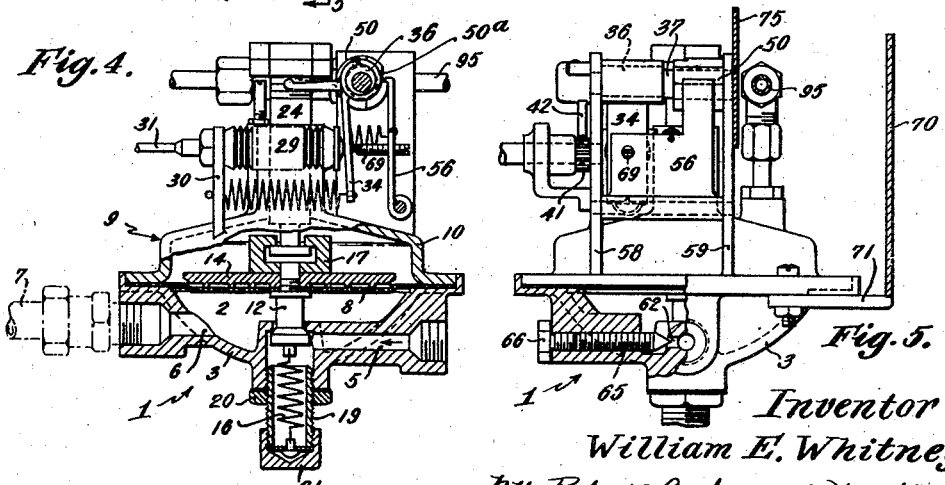
Fig. 4.
Fig. 5.
Inventor
William E. Whitney,
by Roberts, Cushman & Woodberry
Attys.

June 3, 1941.    W. E. WHITNEY    2,243,934
CONTROL ASSEMBLY
Filed March 24, 1938    3 Sheets-Sheet 3

Inventor,
William E. Whitney,
by Roberts, Cushman & Woodberry.
Att'ys.

Patented June 3, 1941

2,243,934

UNITED STATES PATENT OFFICE 2,243,934

CONTROL ASSEMBLY

William E. Whitney, Cambridge, Mass., assignor, by mesne assignments, to Stator Corporation, a corporation of Rhode Island Application March 24, 1938, Serial No. 197,774

17 Claims. (Cl. 62—5)

The present invention relates to an improved device for controlling the flow of fluid which is supplied under pressure and particularly to such a device for regulating the flow of gas supplied from a conventional gas main to a burner or burners. This invention in some respects presents an improved device of the general character disclosed in United States Patent No. 1,909,495 of Alvin S. Mancib.

The present invention provides a control assembly which may be employed to particular advantage in conjunction with a combined refrigerating and water heating apparatus. Such an assembly may comprise two control chambers each of the general type disclosed in the above-identified Mancib patent and each having a wall provided by a yieldably controlled, flexible diaphragm. Thus an arrangement is provided for regulating the pressure of the gas flowing from each chamber to a corresponding burner. In accordance with this invention, the assembly may be provided with manually controllable shafts adapted to be adjusted by knobs on a suitable control panel. One of the control devices is adapted specifically for connection to the main burner of the refrigerating system and has appropriate control factors associated therewith to permit continued efficient refrigeration, while the other control device is adapted specifically to be operatively associated with an auxiliary heater for supplying heat to the hot water tank when more heat is desired than is provided by the refrigerating system. Both of the devices may have somewhat similar control means comprising an expansible-contractible bellows and a manually operable shaft adapted to actuate eccentric means associated with a swinging control member. The eccentric means permits adjustment of the position of the control member, thus permitting modification of the influence of the expansible-contractible bellows upon the control device.

The device associated with the refrigerating system is furthermore provided with additional means to facilitate defrosting of the refrigerator. To permit this desirable result and also to permit continuous operation of the main burner even when the food compartment is relatively cold, a suitable by-pass is provided so that a restricted stream of gas may flow through the control chamber of the device. The control means is arranged so that the mechanism may be temporarily locked to cause the flow of gas to the main burner to be restricted, thus causing operation of that burner at a very low rate. This mechanism is also so arranged that the expansible-contractible element may be effective in releasing the locking means when the food compartment has reached a predetermined, above-freezing temperature; thus permitting the device automatically to resume normal functioning.

One important aspect of the invention involves the provision of a control device provided with a valve connected to a flexible diaphragm. The device may include a valve spring or weight tending to move the valve toward its opened position, while thermostatic controlling means, (e. g., a bellows and an opposing spring) positively opposes movement of the valve toward its open position. Preferably the thermostatic controlling means is associated with rigid connecting structure extending to the valve. This structure includes a joint preventing movement of the valve relative to the controlling means in one direction, but permitting such relative movement in the opposite direction. Accordingly, when the valve can open sufficiently to permit the pressure of the gas upon the diaphragm to balance the action of the valve spring, the valve is not under the control of the thermostatic means. Thus a definite maximum limit is provided for the rate of gas flow through the device.

In the accompanying drawings:

Fig. 2 is a plan view of a portion of my improved control assembly;

Fig. 3 is a front elevational view of the same, with parts shown in section;

Fig. 4 is a sectional view of the control device particularly adapted for association with the refrigerating system;

Fig. 5 is a side elevation of the device shown in Fig. 4;

Control assemblies of the type disclosed herein are particularly adapted for use in conjunction with apparatus including a refrigerating system and water heating means in combination therewith such as the apparatus disclosed in the copending application of Lyman F. Whitney Serial No. 192,343, filed February 24, 1938.

Figure 1:
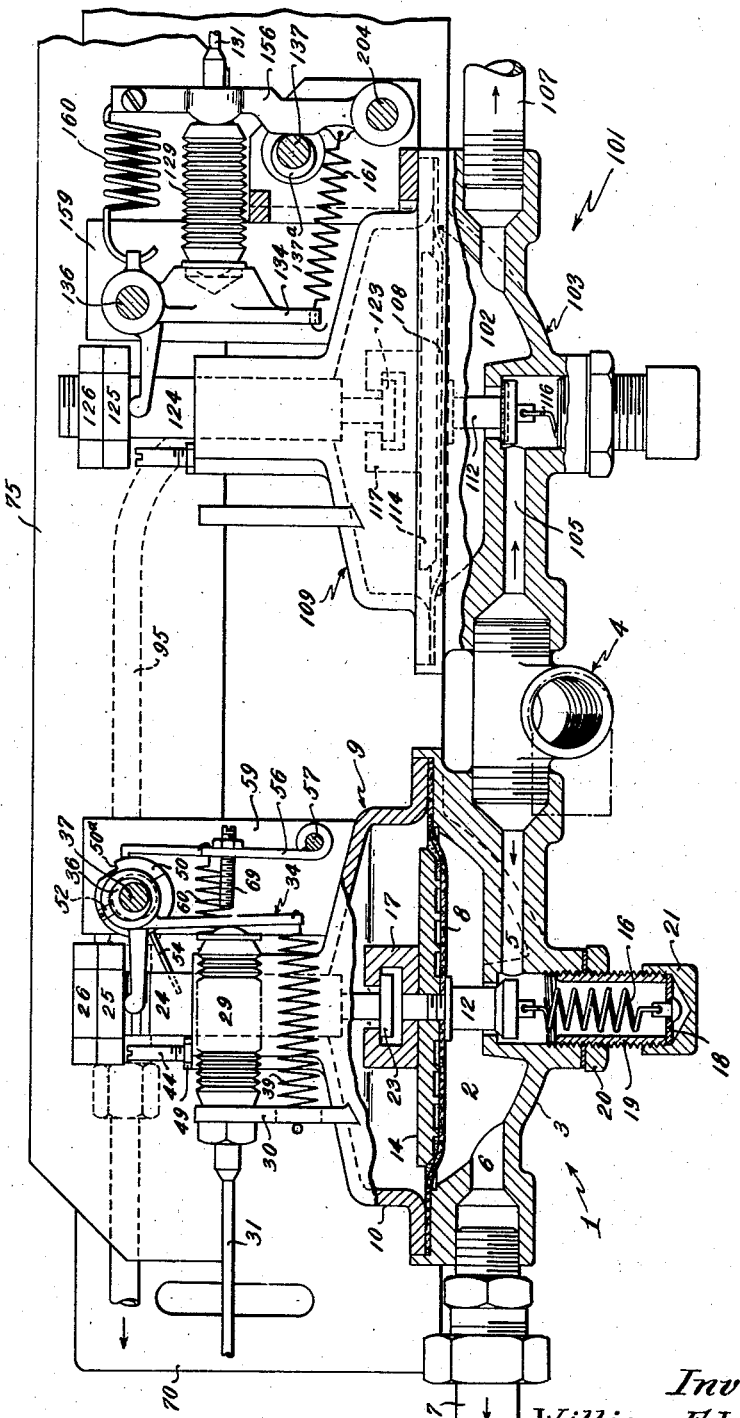
Fig. 1 is a front elevational view of a portion of the control assembly with parts broken away, shown in section and indicated by dotted lines.

Such a control assembly may include two control devices associated with a common supporting means, with a common inlet pipe and with a common safety pipe for connection to a burner chamber, and such an assembly may also be conveniently employed in conjunction with a single control panel arranged in a cabinet of the type disclosed in copending application No. 202,242, filed April 15, 1938, which issued on September 26, 1939 as United States Patent No. 2,174,299. The control assembly comprises two generally similar, although specifically different control devices, as shown in Figs. 1 and 2. One of these devices identified by the reference character 1 is adapted to be employed in association with a gas operated refrigerating system, while the other device 101 is adapted to be employed in association with an auxiliary burner for a hot water tank. A common gas supply connection 4 may have branches communicating with the inlet portions of both the devices 1 and 101.

For purposes of convenience of description, I will first describe in detail the arrangement of the component parts of the device 1.

This device comprises a lower control chamber 2 provided by a lower casting 3. The control chamber is provided with an inlet passage 5 receiving gas from the corresponding branch of the gas supply connection 4. The control chamber is also provided with an outlet passage 6 connected to a suitable line 7 adapted to extend to the main burner of the refrigerator. The upper wall of the control chamber 2 is provided by a flexible diaphragm 8, the margin of which is clamped in place on the peripheral flange of the lower casting 3 by a corresponding flange of an upper casting 9 having an inverted cup-like body portion 10. A valve 12 is arranged to control the flow of gas through the inlet 6 to the control chamber 2.

A tension spring 16 of substantial length is connected to the lower part of the valve 12 and to a disk 18 at the end of an externally threaded tube 19 extending downwardly from the casting 3, this tube being held in place by a nut 20 and provided with a sealing cap 21. The spring 16 therefore yieldably opposes the upward movement of the diaphragm 8 and the valve 12.

Figure 8:
Fig. 8 is an isometric detail.

This valve is provided with a body portion extending through an opening in a disk 14 which has a plurality of annular ribs resting upon the upper surface of the diaphragm 8, thus providing a plurality of spaced surfaces engageable with the diaphragm. Disposed over the disk 14 and secured to the valve is a cylindrical connector 17 having a diametrically disposed slot formed therein, this slot being of inverted T-shaped cross section (Fig. 8). A spindle 24 is slidably mounted in a bore in the upper part of casting 9 and has an end portion or collar 23 fitting beneath the overhanging sections of the slotted part of connector 17. The upper end of the spindle 24 is threaded and receives a nut 25 beneath a locking nut 26. An adjustable stud 44 is threaded into the upper part of the casting 9 and is held in place by a lock nut 49. The upper end of the stud 44 is arranged to act as an abutment to limit the downward movement of the nut 25 and the spindle 24, thus, for example, the weight of the spindle is prevented under all operating conditions from bearing upon the connector 17 and the diaphragm 8. Accordingly, this stud supports the weight of the spindle and the valve assembly, when the device is not connected to a gas line and when there is no superatmospheric pressure beneath the diaphragm 8. The stud 44 also prevents the spindle 24 from imparting a positive downward thrust to the valve through connector 17, it being evident that the lower end surface of the spindle is always spaced from the adjoining bottom surface of the recess in number 17.

In order to permit variation in the rate of gas flow in response to different temperature conditions in the food compartment of the refrigerating system or the like, a suitable expansible-contractible bellows 29, which forms part of a thermostatic means, is secured on a bracket 30 extending upwardly from and integral with the cup-like portion 10 of the casting 9. This bellows 29 may be connected by a flexible tube 31 to a conventional thermostatic bulb located in the vicinity of the evaporator of the refrigerating system or located at any other desired point in the food compartment. It is evident that the bellows 29, the tube 31 and the thermostatic bulb cooperate in affording a liquid containing system arranged so that the fluid causes expansion of the bellows when the temperature of the food compartment rises and permits contraction of the bellows when the food compartment temperature falls.

In order to aid contraction of the bellows under such conditions, a tension spring 39 is connected to the bracket 30 and to an actuating member 34. The latter may be in the form of a bell crank with the spring 39 connected to the lower end of the depending arm thereof. This arm may be in the form of a plate having an intermediate portion engageable by the end of the bellows 29, so that expansion of the bellows tends to swing the corresponding part of the bell crank 34 away from the bracket 30, while, when the pressure within the bellows is reduced, the spring 39 tends to move the depending arm of the bell crank in the opposite direction. The bell crank or member 34 is pivotally mounted on an eccentric portion 36 of shaft 37 and has a substantially horizontal arm with an end portion engageable with the lower surface of the nut 25 on spindle 24. Accordingly an arrangement is provided which results in the lowering of the spindle 24 in response to expansion of the bellows. This permits the downward movement of the disk 14 and of the valve 12 under the influence of spring 16, thereby permitting more gas to flow to the burner of the refrigerator and the operation of the refrigerating system at a higher rate.

Conversely when the temperature of the thermostatic bulb falls, the spring 39 causes the bellows 29 to contract and causes the bell crank 34 to swing in a manner to lift the spindle 24 so that the latter tends to lift the valve towards its closed position.

Since the spring 39 firmly holds the bell crank 34 against the bellows 29, and since the latter preferably contains liquid and may be substantially non-compressible, the thermostatic means, including the bellows, the spring 39 and the bell crank 34, in effect affords a rigid controlling system for the spindle 24. The latter cooperates with the connector 17 in providing connecting structure between the thermostatic controlling means and the valve. The recessed portion of the connector 17 and the collar 23 at the lower end of spindle 24 afford a one-way slip joint connection so that the extent of movement of the valve toward its open position under the influence of spring 16 is rigidly and positively limited by the spindle 24 and the thermostatic controlling means. Thus thermostatic control means is provided automatically to vary the maximum amount the valve may open in response to varying refrigerating demand. When the bellows 29 expands the spindle may gradually lower, thereby permitting the valve 12 to move downwardly under the action of spring 16. Under these conditions the tension imposed by the spring 16 may remain substantially constant since the range of movement of the valve is small compared with the length of the spring. The extent of such a downward movement of the valve is d( 'initely limited by the stud 44.

Under normal inlet gas pressures (which are above the desired maximum pressure in chamber 2), when the valve moves downwardly under the tension of spring 16 as the bellows 29 expands, there comes a point where the gas pressure on the diaphragm 8 balances the tension of the spring and further downward movement of spindle 24 disengages collar 23 from connector 17. When the parts are in such a position, the pressure of the gas upon diaphragm 8 is balanced by the downward pull of spring 16, so that the device automatically functions to limit the maximum pressure in chamber 2 and the maximum rate of gas flow. It is thus evident that as the valve 12 moves from its closed position, it is first under the control of the thermostatic controlling means, acting through the spindle 24 and connector 17, but that when the valve opens sufficiently to permit the gas pressure in chamber 2 to overbalance the spring 16, the valve is removed from control of the thermostatic means and a maximum limit is afforded for the gas pressure in chamber 2 and for the rate of gas flow.

Obviously, the exact point in the path of the valve where it is removed from the control of the thermostatic means depends on the pressure of the inlet gas, this point being nearer the closed position of the valve when the inlet pressure is higher. It is furthermore evident that the thermostatic means resume its control of the valve when the upper surface of collar 23 engages connector 17, due either to the upward movement of the spindle or to a reduction in inlet gas pressure.

In order to permit modification of the influence of the thermostatic means upon the rate of gas flow, a suitable manual control is provided. Such a manual control comprises a shaft 40 (Fig. 2) adapted to be operated by a knob associated with a suitable control panel. This shaft 40 may be provided with a pinion 41 meshing with a toothed sector 42 (Fig. 3) fixed to the shaft 37. Rotation of the shaft 40 accordingly permits variation in the position of the axis of the eccentric 36 about which the bell crank 34 swings. If this axis moves downwardly, while the pressure of the thermostatic bellows 29 does not change, the valve 12 is lowered thus permitting additional gas to flow to the burner of the refrigerating system. Conversely, if the eccentric is adjusted to lift the bell crank, less gas flows to the refrigerating system so that the latter will tend to operate at a lower rate.

The device 1 is also provided with means to facilitate defrosting of the evaporator of the refrigerating system. For this purpose, a sleeve 50 (Fig. 2) is disposed upon the inner end of the shaft 36 and is provided with a shoulder engageable with a pin 52 projecting radially from the shaft. The sleeve 50 is also provided with an arm 54 extending under the nut 25 on spindle 24. A latch 56 is pivotally mounted on a rod 57 extending between front and rear brackets 58 and 59 on casting 9, and is provided with an end portion engageable in a notch 50$^a$ on the sleeve 50. When the shaft 36 is turned in a clockwise direction to its extreme position, corresponding to an extreme movement of the shaft 40 in an anti-clockwise direction, the sleeve 50 is moved to a position permitting the end of the latch 56 to snap into engagement with the notch 50$^a$ (Fig. 4). A tension spring 60 is provided to cause such a motion of the latch. When the sleeve is in this position, the arm 54 is effective in holding the spindle 24 in a relatively elevated position so that the valve 12 is closed (Fig. 4). As soon as the valve has thus been locked in its closed position, the manually controlled shaft 37 and bell crank 34 may be returned to their normal positions.

Under these conditions, gas is prevented from flowing through the inlet passage 6 into the control chamber. However, in order to avoid extinguishing the flame of the main burner, a suitable by-pass is provided to permit the flow of a restricted stream of gas into the control chamber and thence to the main burner. Such a by-pass 62 is shown in Fig. 5, a suitable screw 65 being arranged in a part of the lower casting 3 to permit manual adjustment of the quantity of gas supplied through the by-pass. A cap screw 66 may be arranged outwardly of the screw 65 as shown in Fig. 5.

The latch 56 is provided with an adjustable screw 69 having an end portion which may be engaged by the depending arm of the bell crank 34. Accordingly when the bellows 29 expands sufficiently, it causes the depending arm of the bell crank to engage the end of the screw 69 and to move the latter to the right, as viewed in Fig. 4, causing the latch plate 56 to move out of engagement with the notch 50$^a$. When this occurs, the spindle 24 and associated parts may fall until the nut 25 engages the upper arm of the bell crank 34, the sleeve 50 and the arm 54 meantime swinging freely on the shaft 37. Thereupon the device resumes functioning in the normal manner.

It is accordingly evident that, when it is desired to defrost the refrigerating system, the control shaft 40 is turned in a counter-clockwise direction to cause a clockwise movement of the shaft 37 to bring the sleeve 50 into its locked position and thus to cause the valve 12 to be held in its closed position. Thereupon the shaft 40 and the shaft 36 may be returned to their respective normal positions. The positions then occupied by the parts of device 1 are shown in Figs. 2 and 4.

It is thus evident that the device 1 permits the automatic regulation rate of gas flowing to the burner in response to different temperatures of the expansible contractible means, while limiting the rate of gas supply to a definite maximum. Furthermore such a device provides a manual adjustment so that the influence of the thermostatic means upon the flow of gas may be varied, while means is also provided to facilitate defrosting of a refrigerator and the automatic resumption of normal refrigeration at the end of the defrosting period.

The device 101 in many respects is similar to the device 1, having a lower casting 103 providing a control chamber 102 having an inlet 105 controlled by a valve 112 associated with a flexible diaphragm 108 supporting a disk 114 and carrying a connector 117, engageable with a collar 123 of a spindle 124. The spindle 124 carries nuts 125 and 126 corresponding to the nuts 25 and 26 and the upper casting 109 of the device 101 is provided with integral upstanding brackets 158 and 159 which afford supports for a rod 136 pivotally supporting a bell crank 134. A flexible bellows 129 may be responsive to the temperature of water in a storage tank. This bellows is disposed between the depending leg of the bell crank 134 and an upstanding arm 156 which is pivotally mounted on a rod 204. A tension spring 160 extends between the intermediate portion of the bell crank 134 and the upper end of the arm 156 while a spring 161 extends between the lower parts of members 134 and 156. The arm 156 thus affords an abutment engaging one end of the bellows 129 and yieldably urging the end of the latter toward the depending arm of the bell crank 134.

A manually operable control shaft 140 is arranged for actuation by an exterior knob associated with the control panel. This shaft is provided with a pinion 141 (Fig. 2) meshing with a toothed sector 142 mounted on the end of a shaft 137. The latter is provided with an eccentric portion 137ᵃ having a cam-like engagement with the arm 156. Accordingly when the manually actuable shaft 140 is rotated, the shaft 137 is turned through the gear means 141—142 and the position of the arm 156 is varied thus altering the position of the right end of bellows 129, as viewed in Fig. 1. Accordingly a manually controllable adjustment is provided for the device 101, it being evident that when the arm 156 is swung to the right, as viewed in Fig. 1, the valve 112 is caused to operate before the temperature of the water in the storage tank falls so far as would be necessary for actuation of the valve if the arm were swung further toward the left.

The eccentric 137ᵃ may provide a wide range of adjustment. In the position of the eccentric shown in Fig. 1, the device may be so adjusted that even unheated water does not cause the bellows 129 to contract sufficiently to operate valve 112. Accordingly the manual adjustment may be employed to make the booster burner inoperative, if desired.

It is to be understood that the bellows 129 is connected to a tube 131 which in turn is connected to a thermostatic bulb in heat transfer relation to a part of the hot water tank. The bellows, the tube, and the bulb constitute parts of a fluid containing device arranged so that an increase in the temperature of the bulb tends to cause expansion of the bellows 129. Expansion of the bellows tends to cause the substantially horizontal arm of the bell crank 34 to swing upwardly thus tending to lift the spindle 125 and move the valve 112 to its closed position against the action of spring 116, while contraction of the bellows tends to cause opening of the valve. The control chamber 102 of the device 101 is provided with an outlet passage which is connected to a gas supply line 107 which may be connected to a suitable booster burner or preferably may be connected to a pilot associated with such a burner and arranged to be lit by the main burner of the refrigerator in a manner fully described in the copending application of Lyman F. Whitney and William E. Whitney, Serial No. 192,344, filed February 24, 1938, which issued on June 6, 1939 as United States Patent No. 2,161,214.

The thermostatic bellows 129, the bell crank 134, the lever 156 and the spring 160 are preferably so arranged relative to each other that a substantial increase in the temperature of the thermostatic means will cause the closing of the valve 112, thus entirely interrupting the flow of gas to the burner associated with the water heating system when the temperature of the water in the tank reaches a predetermined point. Obviously the device 101 preferably is so constructed that there is no by-pass passage corresponding to the passage 62 of the device 1.

The devices 1 and 101 are secured to a common support comprising a vertical plate 70 with horizontal extensions 71 (Figs. 2 and 7) secured to the flanged portions of the upper and lower castings of each of the devices. Furthermore, the brackets 59 and 159 may be secured in face-to-face relation to a metal strap 75. This strap may form the rear wall of box-like housing 76 (Fig. 7) disposed over the upper parts of devices 1 and 101.

Figure 6:
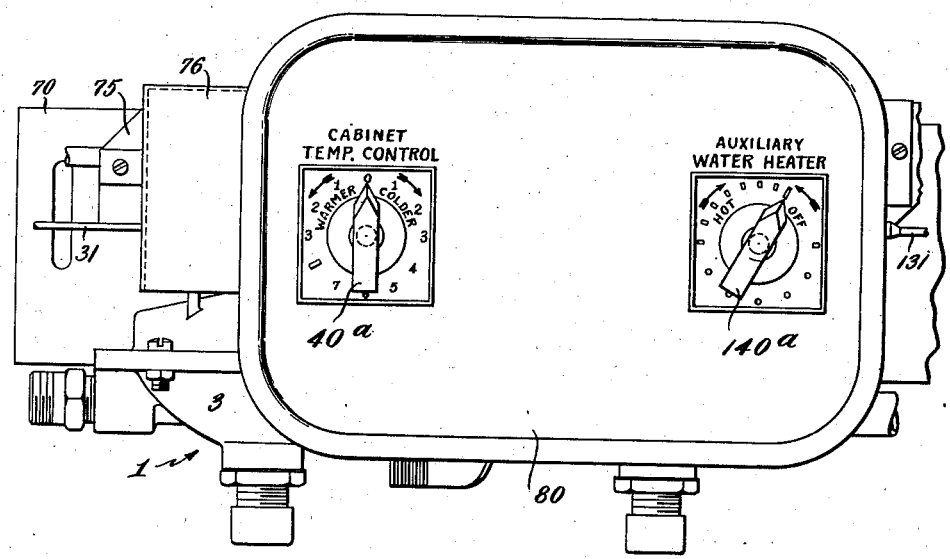
Fig. 6 is a front elevation of the assembly showing the control panel.
Figure 7:
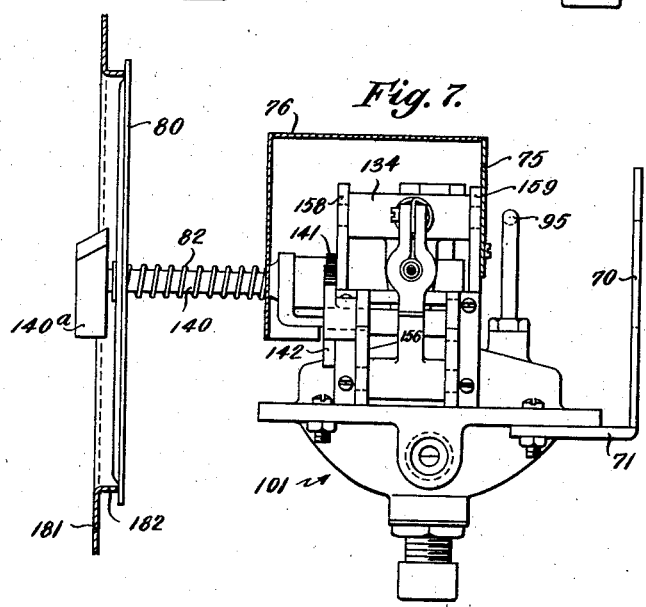
Fig. 7 is an end elevation of the same with certain parts shown in section.

The control assembly also includes a control panel 80, shown in Figs. 6 and 7. The shafts 40 and 140 project through openings in the panel 80 and carry control knobs 40ᵃ and 140ᵃ, respectively. The control panel 80 may be provided with suitable indicia in the region of the knobs as shown in Fig. 6. Obviously the control panel 80 may be assembled with a cabinet having an opening to register therewith in the general manner taught in the above-identified application, Serial No. 202,242, filed April 15, 1938, now United States Patent No. 2,174,299, a wall 181 of such a cabinet being shown in Fig. 7. The panel 80 preferably is supported by the shafts 40 and 140 which are provided with compression springs 82 engaging the front wall of housing 76 and the rear face of the panel 80. Thus the springs 82 urge the panel 80 forwardly into engagement with a flange 182 on the wall 181 of the cabinet.

The upper chambers of devices 1 and 101 also have connections with a safety duct 95 which may extend to the housing of the main burner that is supplied with gas through the device 1. Thus if there should be leakage of gas through either the diaphragm 8 or 108, the leaking gas may be directed to the main burner or the main burner stack.

Figure 9:
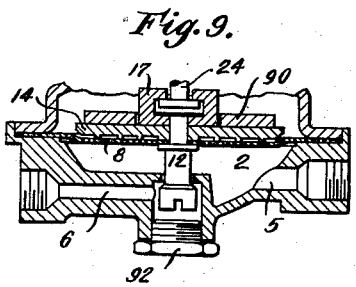
Fig. 9 is a vertical section of an optional device.

Fig. 9 illustrates an optional control device provided with a control chamber 2 having an inlet passage 5 and an outlet passage 6, the flow of gas from the inlet passage to the chamber being controlled by a valve 12. The upper wall of the chamber is provided by a diaphragm 8 supporting a disk 14 and a connector 17 associated with the lower end of a spindle 24 in the same general manner as has been described. However, in this embodiment of the invention the spring 16 is omitted and a weight 90 is disposed on the disk 14 to afford a downwardly acting force corresponding to the downward pull of the spring 16.

In this embodiment of the invention the externally-threaded tube 19 and the cap 21 may be omitted and a plug 92 may be threaded directly into the lower part of the casing. It is evident that a device constructed in accordance with the arrangement shown in Fig. 9 may be provided with cooperating factors and adjuncts similar to those disclosed in the preceding figures of the drawings, and that the operation of such a device is generally similar to the operation of the device previously described, the weights 90 performing the same function as the spring 16.

It is evident that the present invention affords a convenient and effective control assembly arranged to regulate the flow of gas to the burners of a household appliance such as a combined refrigerating and water-heating system. Such a device may permit automatic control of fuel flow and manual adjustment of the automatic control and may be provided with an arrangement to facilitate defrosting of the refrigerator and subsequent automatic resumption of normal operation.

It should be understood that the present disclosure is for the purpose of illustration only and that this invention includes all modifications and equivalents which fall within the scope of the appended claims.

I claim:

1. Gas control device comprising a gas-receiving chamber having an inlet and an outlet, a diaphragm forming one wall of the chamber, a valve connected to the diaphragm and controlling the flow of gas through the chamber, means urging the valve towards its opened position, and thermostatic means including a temperature-responsive element, said element acting upon said valve rigidly and positively to oppose the action of said first-named means within a range of movement of the valve, whereby the position of the valve in said range is determined by temperature conditions, the gas pressure in the chamber acting as the valve moves toward its opened position and is at the end of said range in removing the valve and diaphragm from the influence of the thermostatic means, so that the first-named means then determines the maximum pressure within the chamber.

2. Gas control device comprising a gas-receiving chamber having an inlet and an outlet, a diaphragm forming one wall of the chamber, a valve connected to the diaphragm and controlling the flow of gas through the inlet, means yieldably urging the valve toward its opened position, thermostatic means including an expansible-contractible bellows, connecting structure between the valve and the thermostatic means, said thermostatic means acting through said structure to control the position of the valve throughout a range wherein the effect of the first-named means on the diaphragm more than balances the effect of gas pressure upon the diaphragm, the connecting structure being arranged so that the valve is relieved from control by the thermostatic means when gas pressure in the chamber is high enough to balance the effect of said first-named means.

3. Gas control device comprising a gas-receiving chamber having an inlet and an outlet, a diaphragm forming one wall of the chamber, a valve connected to the diaphragm and controlling the flow of gas through the inlet, means yieldably urging the valve toward its opened position, thermostatic means including an expansible-contractible bellows and a spring tending to contract the bellows, connecting structure between the valve and the thermostatic means, the expansion of the bellows tending to result in the movement of the valve away from its closed position, said thermostatic means acting through said structure to control the position of the valve as long as the effect of the first-named means on the diaphragm more than balances the effect of gas pressure upon the diaphragm, the connecting structure being arranged so that the valve is relieved from control by the thermostatic means when gas pressure in the chamber is high enough to balance the effect of said first-named means.

4. Gas control device comprising a gas-receiving chamber having an inlet and an outlet, a diaphragm forming one wall of the chamber, a valve connected to the diaphragm and controlling the flow of gas through the inlet, means yieldably urging the valve toward its opened position, thermostatic means including an expansible-contractible bellows and a spring tending to contract the bellows, connecting structure between the valve and the thermostatic means, the expansion of the bellows tending to result in the movement of the valve away from its closed position, said thermostatic means acting through said structure to control the position of the valve, when the effect of the first-named means on the diaphragm more than balances the effect of gas pressure upon the diaphragm, the connecting structure being arranged so that the valve is relieved from control by the thermostatic means when gas pressure in the chamber is high enough to balance the effect of said first-named means, means for moving the valve substantially to closed position, and a spring actuated lock thereupon automatically operative to retain the valve in substantially closed position, said lock being releasable in response to continued expansion of the bellows, thereby allowing resumption of the control of the valve by the thermostatic means.

5. A gas control device of the class described comprising a control chamber having an inlet and an outlet and having one wall formed by a flexible diaphragm, a valve connected to the diaphragm and controlling the flow of gas through said inlet, a thermostat for influencing the position of the valve, a part connected to the valve, a bell crank disposed between said thermostat and said part connected to the valve, and eccentric means manually adjustable to vary the position of the bell crank member, thereby to vary the influence of the thermostat upon the diaphragm and the valve.

6. A control device of the class described comprising a casing including a control chamber, one wall of which is provided by a flexible diaphragm, said chamber having an inlet and an outlet, a valve connected to the diaphragm and regulating the flow of gas through said inlet, a spindle extending through the wall of the casing and operatively connected to said valve, a bell crank member having one arm engageable with the exterior part of said spindle to vary the position thereof, an expansible-contractible element acting upon the other arm of the bell crank, a shaft providing an eccentric portion which affords a pivot for the bell crank, said shaft being manually rotatable to vary the position of the bell crank and thus vary the influence of the expansible-contractible element upon the valve and diaphragm.

7. A control device of the class described comprising a casing having a control chamber, a flexible diaphragm forming one wall of said chamber, said chamber having a gas inlet and a gas outlet, a valve connected to said diaphragm and controlling the flow of gas through said inlet, an expansible-contractible element arranged to influence the position of said valve, and manually operable means temporarily to interrupt the influence of said element upon said valve so that said valve may be positioned for defrosting, said means being arranged so that the element finally expands to a point where it releases said means whereby the control device resumes normal functioning.

8. A control device of the class described comprising a control chamber, a flexible diaphragm forming one wall of the chamber, said chamber having a gas inlet and a gas outlet, a valve connected to the diaphragm and controlling the flow of gas through said chamber, a part extending from said valve and having a portion outside of said chamber, an expansible-contractible element, a movable member engageable by said element and engaging said part to vary the position of the valve in response to the condition of said element, a manual control for varying the position of said member and thus varying the influence of said element on the position of said valve, and a latch arranged to be locked when the manual control is moved to one end of its path, said latch then holding the valve in a defrosting position, said latch being releasable when said element expands in response to a relatively high temperature, whereby the device may then resume normal functioning.

9. A control device of the class described comprising a control chamber, a flexible diaphragm forming one wall of the chamber, said chamber having a gas inlet and a gas outlet, a valve connected to said diaphragm, means yieldably tending to move the valve away from its closed position, a spindle arranged to move said valve toward closed position, a bell crank for actuating said spindle, and an expansible-contractible bellows for varying the position of the bell crank.

10. A control device of the class described comprising a control chamber, a flexible diaphragm forming one wall of the chamber, said chamber having a gas inlet and a gas outlet, a valve connected to said diaphragm, means yieldably opposing the movement of the valve away from its closed position, a spindle arranged to move said valve toward closed position, a bell crank having an arm arranged to actuate said spindle, an expansible-contractible element having an end arranged to move the other arm of the bell crank, a swinging member engaging the opposite end of said element, spring means extending between said bell crank and member, and a manually controllable eccentric to vary the position of said member.

11. A control device of the class described comprising a control chamber, a flexible diaphragm forming one wall of the chamber, said chamber having a gas inlet and a gas outlet, a valve connected to said diaphragm, means yieldably opposing the movement of the valve toward its closed position, a spindle arranged to move said valve toward closed position, a bell crank having an arm arranged to actuate said spindle, an expansible-contractible element having an end arranged to move the other arm of the bell crank, a spring opposing the expansible-contractible element, and a manually actuable eccentric on which the bell crank is pivotally mounted, said eccentric being adjustable to vary the influence of said element upon the position of the spindle.

12. A control device of the class described comprising a control chamber, a flexible diaphragm forming one wall of the chamber, said chamber having a gas inlet and a gas outlet, a valve connected to said diaphragm, means yieldably opposing the movement of the valve toward its closed position, a spindle arranged to move said valve toward closed position, a bell crank having an arm arranged to actuate said spindle, an expansible-contractible element having an end arranged to move the other arm of the bell crank, a spring opposing the expansible-contractible element, a swinging member having a part arranged to move the spindle to cause a closing movement of the valve, a latch for said member, and means through which the last-named arm of the bell crank may be actuated by said element to release the latch so that the valve can then move toward open position.

13. Gas control device comprising a gas-receiving chamber having an inlet and an outlet, a diaphragm forming one wall of the chamber, a valve connected to the diaphragm and controlling the flow of gas through the chamber, means urging the valve toward its opened position, control means including a thermostatic element and acting upon said valve to oppose the action of said first-named means within a range of movement of the valve whereby the position of the valve in said range is normally determined by temperature conditions, the gas pressure in the chamber acting as the valve moves toward its open position and is at the end of said range in removing the valve and diaphragm from the influence of the control means so that the first-named means then determines the maximum pressure within the chamber, and a manual control for interrupting regulation of the position of the valve by the control means or by the gas pressure, said manual control being arranged to move the valve substantially to a closed position, a latch effective to lock the valve in the last-named position, the control means being automatically operable in response to a relatively high temperature in releasing the latch, so that the position of the valve may thereupon be determined by the control means or by the gas pressure.

14. Gas control device comprising a gas-receiving chamber having an inlet and an outlet, a diaphragm forming one wall of the chamber, a valve connected to the diaphragm and controlling the flow of gas through the chamber, means yieldingly urging the valve toward its open position, and control means including a temperature-responsive element, said control means having a one way slip-joint connection with the valve, said control means acting through said connection to oppose the tendency of the first named means to open the valve, thus permitting the positioning of the valve in various partially opened positions dependent upon the temperature of said element, the slip-joint permitting the removal of the valve from the control of the control means when the valve has opened sufficiently to cause the gas pressure to balance the effect of said first-named means.

15. Gas control device comprising a gas receiving chamber having an inlet and an outlet, a diaphragm forming one wall of the chamber, a valve connected to the diaphragm and controlling the flow of gas through the chamber, means yieldingly urging the valve toward its open position, and control means including a temperature-responsive element, said means determining the position of the valve within a range of movement near its closed position, connecting structure disposed between said control means and said valve and including a one way slip-joint, said means acting to impose stress on said structure to oppose the tendency of the first named means to move the valve toward its opened position, thus permitting the positioning of the valve in various partially opened positions dependent upon the temperature of the said element, the slip-joint permitting the removal of the valve from the control of the control means and the release of the connecting structure from stress when the valve has opened sufficiently to cause the gas pressure to balance the effect of the first-named means.

16. A gas control device of the class described comprising a control chamber having an inlet and an outlet and having one wall formed by a flexible diaphragm, a valve connected to the diaphragm and controlling the flow of gas through said inlet, a thermostatic device, a movable member, said device acting through said member to vary the position of the diaphragm and valve in accordance with temperature conditions, and a shaft provided with eccentric means to vary the position of the member, thereby to vary the effectiveness of the influence of the thermostatic device on the diaphragm.

17. A gas control device of the class described comprising a control chamber having an inlet and an outlet and having one wall formed by a flexible diaphragm, a valve connected to the diaphragm and controlling the flow of gas through said inlet, a thermostatic device, a movable member, said device acting through said member to vary the position of the diaphragm and valve in accordance with temperature conditions, a control shaft carrying a toothed part, and a manually movable shaft carrying an intermeshing part, said control shaft having an eccentric engageable with said member to vary the position thereof, thereby to vary the effectiveness of the influence of the thermostat upon the position of the diaphragm and valve.

WILLIAM E. WHITNEY.